1

United States Patent
Jacobsen et al.

(10) Patent No.: US 10,086,736 B1
(45) Date of Patent: Oct. 2, 2018

(54) CUP HOLDER ASSEMBLY HAVING STABILIZERS

(71) Applicant: Ford Global Technologies, LLC, Dearborn, MI (US)

(72) Inventors: Stephen Neal Jacobsen, Plymouth, MI (US); Michele M. Mathews, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/471,375

(22) Filed: Mar. 28, 2017

(51) Int. Cl.
*B65D 25/00* (2006.01)
*B60N 3/10* (2006.01)

(52) U.S. Cl.
CPC .............. *B60N 3/108* (2013.01); *B60N 3/106* (2013.01)

(58) Field of Classification Search
CPC .............................................. B60N 3/10–3/108
USPC .................... 220/737–743; 215/386–399; 294/137–172
See application file for complete search history.

(56) References Cited

U.S. PATENT DOCUMENTS

| | | | |
|---|---|---|---|
| 5,839,711 A | 11/1998 | Bieck et al. | |
| 7,458,481 B2 * | 12/2008 | Yuen | A45C 11/20 220/737 |
| 7,748,679 B2 | 7/2010 | Kikuchi | |
| 8,113,477 B2 | 2/2012 | Kaemmer | |
| 8,534,862 B2 | 9/2013 | Simon et al. | |
| 8,733,724 B2 | 5/2014 | Voigt et al. | |
| 2009/0146035 A1 | 6/2009 | Kaemmer | |
| 2010/0090079 A1 | 4/2010 | Choi | |
| 2011/0297717 A1 | 12/2011 | Kaemmer | |
| 2012/0256439 A1 * | 10/2012 | Ayarturk | B60R 7/06 296/37.12 |
| 2013/0239592 A1 * | 9/2013 | Lofy | B60N 3/104 62/3.61 |
| 2015/0314819 A1 | 11/2015 | Langenbacher et al. | |

FOREIGN PATENT DOCUMENTS

| | | |
|---|---|---|
| DE | 102005008626 B4 | 4/2008 |
| DE | 102010061250 A1 | 6/2012 |
| JP | 2011111073 A | 6/2011 |

* cited by examiner

*Primary Examiner* — Kareen Thomas
(74) *Attorney, Agent, or Firm* — Vichit Chea; Price Heneveld LLP (57) ABSTRACT

A cup holder assembly includes a container aperture, a travel guide, a stabilizer arm aperture, a stabilizer arm, and a biasing member. The travel guide is on an exterior surface of the container aperture. The stabilizer arm aperture is radially inward of the travel guide. The stabilizer arm is pivotable about a living hinge and is inserted into the stabilizer arm aperture. The travel guide guides radial actuation of the stabilizer arm. The biasing member biases the stabilizer arm radially inward.

20 Claims, 7 Drawing Sheets

CUP HOLDER ASSEMBLY HAVING STABILIZERS

FIELD OF THE DISCLOSURE

The present disclosure generally relates to a cup holder. More specifically, the present disclosure relates to a cup holder having enhanced stabilizers.

BACKGROUND OF THE INVENTION

Automotive vehicles are commonly equipped with various trim components that provide aesthetically pleasing and functional features onboard the vehicle. Some automotive vehicles also employ drink or beverage holders, such as a cup holder, to retain beverage containers such that the containers do not tip over during vehicle maneuvers (e.g. acceleration, deceleration, cornering, etc.). The cup holder may include stabilizers or clamping arms that can receive various diameters of beverage containers. However, the stabilizers or clamping arms of conventional cup holders can be over-extended out of the beverage container receptacle such that the stabilizers remain fully-extended or over-extended out of the beverage container receptacle, thereby preventing further use of the over-extended stabilizer without consumer intervention. It is therefore desirable to provide a cup holder that prevents over-extension of the stabilizers.

SUMMARY OF THE INVENTION

According to a first aspect of the present disclosure, a cup holder assembly includes a first portion. The first portion includes a plurality of container apertures, travel guides positioned on an exterior surface of the container apertures, a stabilizer arm aperture in a perimeter of the container apertures positioned radially inward of each travel guide, and one or more clip-engagement features. The cup holder assembly further includes a second portion. The second portion includes one or more clips that are configured to couple with the clip-engagement features of the first portion, a plurality of stabilizer arms integrally formed with the second portion, and a biasing member. The number of clips corresponds to the number of clip-engagement features. Each of the stabilizer arms is pivotable about a living hinge and is inserted into one of the stabilizer arm apertures. The travel guides guide radial actuation of the stabilizer arms to prevent side-to-side movement of the stabilizer arms within the stabilizer arm apertures and prevent over-extension of the stabilizer arms, which can result in the stabilizer arm exiting the stabilizer arm aperture. The biasing member is positioned about the perimeter of the container apertures and biases the stabilizer arms radially inward.

Embodiments of the first aspect of the present disclosure can include any one or a combination of the following features:
- the cup holder assembly further includes downward facing alignment receptacles on the first portion and upward facing alignment pegs on the second portion to aid in proper alignment of the first portion and the second portion during assembly;
- the cup holder assembly further includes a plurality of upward retention features, wherein the plurality of upward retention features prevent the biasing member from longitudinal movement in an upward direction along the perimeter of the container apertures;
- the cup holder assembly further includes a plurality of downward retention features, wherein the plurality of downward retention features prevent the biasing member from longitudinal movement in a downward direction along the perimeter of the container apertures; and
- the stabilizer arms each include a biasing member engagement feature on an outward surface of the stabilizer arms such that continuous contact is maintained between the biasing member and the stabilizer arms when assembled.

According to a second aspect of the present disclosure, a cup holder assembly includes a first portion. The first portion includes travel guides positioned on an exterior surface of the first portion and a stabilizer arm aperture positioned radially inward of each travel guide. The cup holder assembly further includes a second portion. The second portion has a plurality of stabilizer arms and a biasing member. Each of the stabilizer arms is pivotable about a living hinge and is inserted into one of the stabilizer arm apertures. The travel guides guide radial actuation of the stabilizer arms. The biasing member is positioned about a perimeter of the first portion and biases the stabilizer arms radially inward.

Embodiments of the second aspect of the present disclosure can include any one or a combination of the following features:
- the travel guides prevent side-to-side movement of the stabilizer arms within the stabilizer arm apertures;
- the travel guides prevent over-extension of the stabilizer arms;
- the cup holder assembly further includes one or more clip-engagement features positioned on the first portion;
- the cup holder assembly further includes one or more clips positioned on the second portion that are configured to couple with the clip-engagement features, wherein the number of clips corresponds to the number of clip-engagement features;
- the cup holder assembly further includes a plurality of upward retention features, wherein the plurality of upward retention features prevent the biasing member from longitudinal movement in an upward direction along the perimeter of the first portion;
- the cup holder assembly further includes a plurality of downward retention features, wherein the plurality of downward retention features prevent the biasing member from longitudinal movement in a downward direction along the perimeter of the first portion; and
- the stabilizer arms each include a biasing member engagement feature on an outer surface of the stabilizer arms such that continuous contact is maintained between the biasing member and the stabilizer arms when assembled.

According to a third aspect of the present disclosure, a cup holder assembly includes a container aperture, a travel guide, a stabilizer arm aperture, a stabilizer arm, and a biasing member. The travel guide is on an exterior surface of the container aperture. The stabilizer arm aperture is radially inward of the travel guide. The stabilizer arm is pivotable about a living hinge and is inserted into the stabilizer arm aperture. The travel guide guides radial actuation of the stabilizer arm. The biasing member biases the stabilizer arm radially inward.

Embodiments of the third aspect of the present disclosure can include any one or a combination of the following features:
- the travel guides prevent side-to-side movement of the stabilizer arms within the stabilizer arm apertures;

the travel guides prevent over-extension of the stabilizer arms;

the cup holder assembly further includes a plurality of upward retention features, wherein the plurality of upward retention features prevent the biasing member from longitudinal movement in an upward direction along a perimeter of the container aperture;

the cup holder assembly further includes a plurality of downward retention features, wherein the plurality of downward retention features prevent the biasing member from longitudinal movement in a downward direction along a perimeter of the container aperture;

the stabilizer arms each include a biasing member engagement feature on an outward surface of the stabilizer arms such that continuous contact is maintained between the biasing member and the stabilizer arms when assembled; and the biasing member is positioned about a perimeter of the container aperture.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
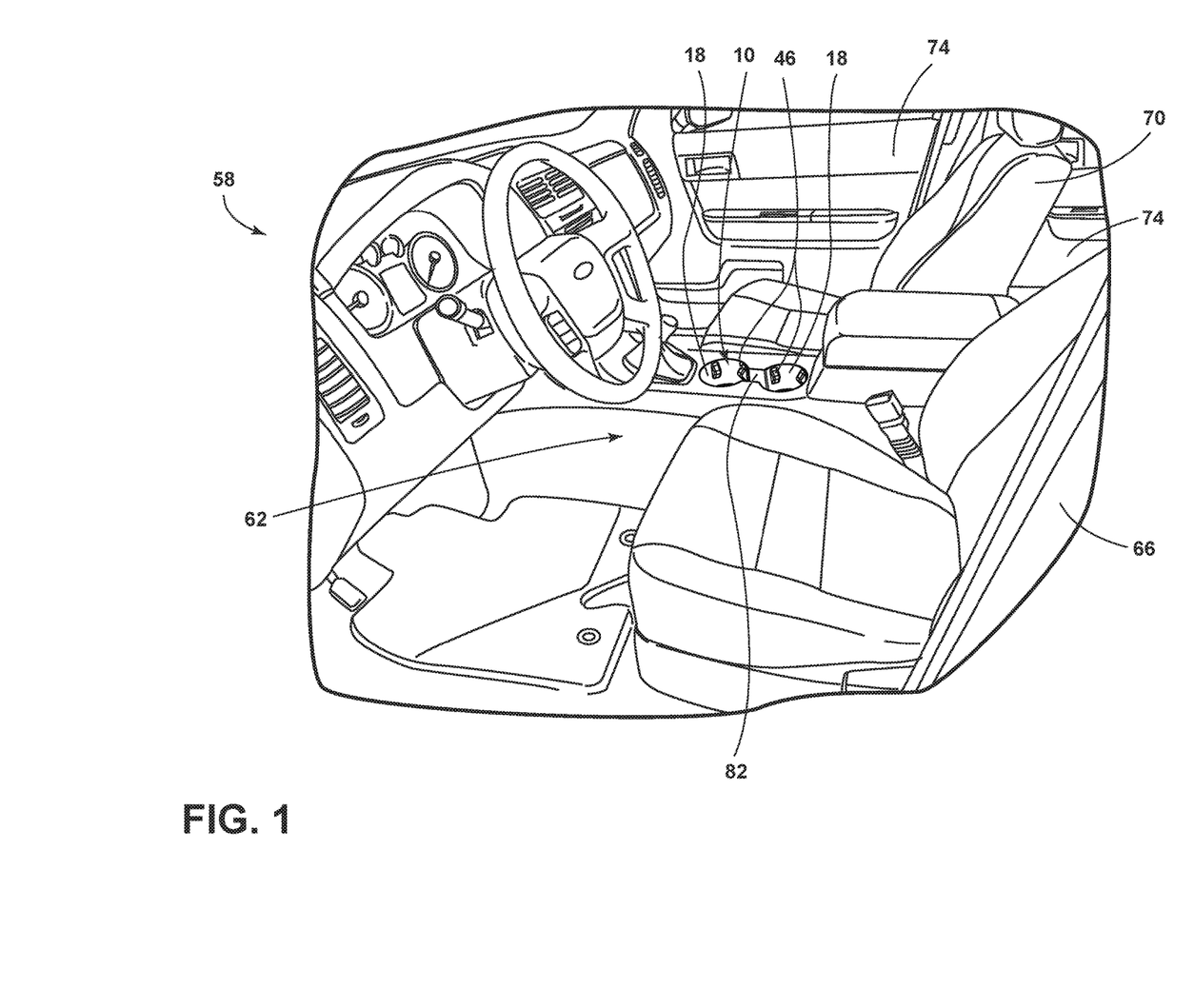
FIG. 1 is a side perspective view of an interior of a vehicle having a cup holder assembly, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a cup holder. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-8, a cup holder assembly 10 includes a first portion 14. The first portion 14 includes a plurality of container apertures 18, travel guides 22 positioned on an exterior surface 26 of the container apertures 18, a stabilizer arm aperture 30 in a perimeter of the container apertures 18 positioned radially inward of each travel guide 22, and one or more clip-engagement features 34. The cup holder assembly 10 further includes a second portion 38. The second portion 38 includes one or more clips 42 that are configured to couple with the clip-engagement features 34 of the first portion 14, a plurality of stabilizer arms 46 integrally formed with the second portion 38, and a biasing member 50. The number of clips 42 corresponds to the number of clip-engagement features 34. Each of the stabilizer arms 46 is pivotable about a living hinge 54 and is inserted into one of the stabilizer arm apertures 30. The travel guides 22 guide radial actuation of the stabilizer arms 46 to prevent side-to-side movement of the stabilizer arms 46 within the stabilizer arm apertures 30 and prevent over-extension of the stabilizer arms 46, which can result in the stabilizer arm 46 exiting the corresponding stabilizer arm aperture 30. The biasing member 50 is positioned about the perimeter of the container apertures 18 and biases the stabilizer arms 46 radially inward.

Referring again to FIGS. 1 and 2, the cup holder assembly 10 can be installed in a vehicle 58, such as a wheeled automotive vehicle. More specifically, the cup holder assembly 10 can be installed in a center console 62 of the vehicle 58. The center console 62 is typically positioned between a driver seat 66 and a passenger seat 70. The cup holder assembly 10 may be positioned elsewhere in the vehicle 58, for example, in a door 74 of the vehicle 58. The container aperture 18 can be equipped with one or more of the stabilizer arms 46. The stabilizer arm 46 protrudes through the stabilizer arm aperture 30 and into the container aperture 18. In embodiments that employ more than one stabilizer arm 46, the stabilizer arms 46 can be positioned about a circumference of the container aperture 18 such that lateral support to a container 78 is provided on at least two sides of the container 78. For example, in embodiments that employ an even number of stabilizer arms 46, the stabilizer arms 46 can be positioned immediately opposite one of the other stabilizer arms 46 to provide opposing lateral retention forces to the container 78. In other words, embodiments that employ two stabilizer arms 46 can have the stabilizer arms 46 positioned about the circumference of the container aperture 18 such that the stabilizer arms 46 are separated by approximately 180 degrees. Alternatively, embodiments that employ two stabilizer arms 46 can have the stabilizer arms 46 positioned about the circumference of the container aperture 18 such that the stabilizer arms 46 are separated by approximately 90 degrees. In such an embodiment where two stabilizer arms 46 are employed and are separated by approximately 90 degrees, the stabilizer arms 46 can provide sufficient force to the container 78 such that the container 78 maintains contact with the container aperture 18 on a side of the container 78 that is opposite the stabilizer arms 46. As such, when using the stabilizer arms 46 in such a configuration, some embodiments may rely on the container 78 being sandwiched between the stabilizer arms 46 and the container aperture 18 rather than between multiple stabilizer arms 46 to maintain the container 78 in an upright position during vehicle maneuvers. In a further alternative, the cup holder assembly 10 may be equipped with four stabilizer arms 46. In embodiments that employ four stabilizer arms 46, the stabilizer arms may be spaced circumferentially about the perimeter of the container aperture 18 such that the stabilizer arms 46 are approximately equidistant from one another. For example, the four stabilizer arms 46 may be separated by approximately 90 degrees from adjacent stabilizer arms 46.

Figure 2:
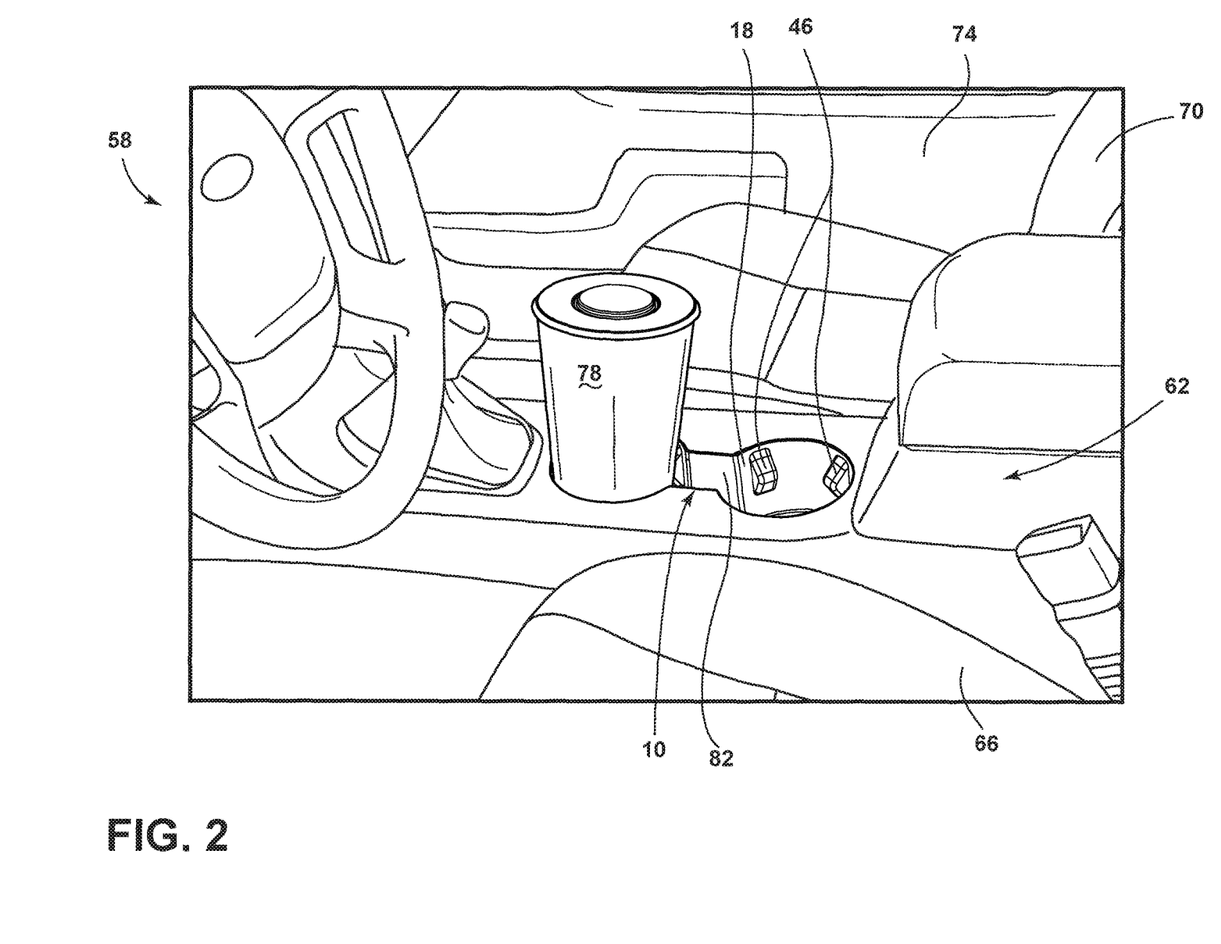
FIG. 2 is an enlarged side perspective view of a center console region of an interior of a vehicle, illustrating the cup holder assembly.

Referring further to FIGS. 1 and 2, the cup holder assembly 10 may be equipped with an odd number of stabilizer arms 46. For example, the cup holder assembly 10 may be equipped with one stabilizer arm 46 that provides lateral support to the container 78. In embodiments that employ a single stabilizer arm 46, the stabilizer arm 46 can provide sufficient lateral retention force to retain the container 78 in an upright position during vehicle maneuvers. In some embodiments that employ a single stabilizer arm 46, the stabilizer arm 46 can provide sufficient force to the container 78 such that the container 78 maintains contact with the container aperture 18 on a side of the container 78 that is opposite the stabilizer arm 46. As such, when using a single stabilizer arm 46, some embodiments may rely on the container 78 being sandwiched between the single stabilizer arm 46 and the container aperture 18 rather than between multiple stabilizer arms 46 to maintain the container 78 in an upright position during vehicle maneuvers. Alternatively, the cup holder assembly 10 can be equipped with an odd number of stabilizer arms 46 that is greater than one. For example, the cup holder assembly 10 may be equipped with three stabilizer arms 46. In embodiments that employ three stabilizer arms 46, the stabilizer arms can be spaced approximately equidistant from one another about the circumference of the container aperture 18. For example, the three stabilizer arms 46 can be spaced about the circumference of the container aperture 18 at about 120 degree intervals. Alternatively, the three stabilizer arms 46 may be spaced apart from one another such that the circumferential spacing between the stabilizer arms 46 is not consistent. That is, the three stabilizer arms 46 can be spaced apart from one another on the circumference of the container aperture 18 in a manner that does not place the stabilizer arms 46 equidistant from one another. While the cup holder assembly 10 is shown having two container apertures 18 that are spaced apart by an open transition portion 82, it is contemplated that the cup holder assembly 10 may include a single container aperture 18. Alternatively, the cup holder assembly 10 may include more than two container apertures 18 that may be interconnected with one another in a manner similar to that depicted utilizing the open transition portion 82.

Figure 3:
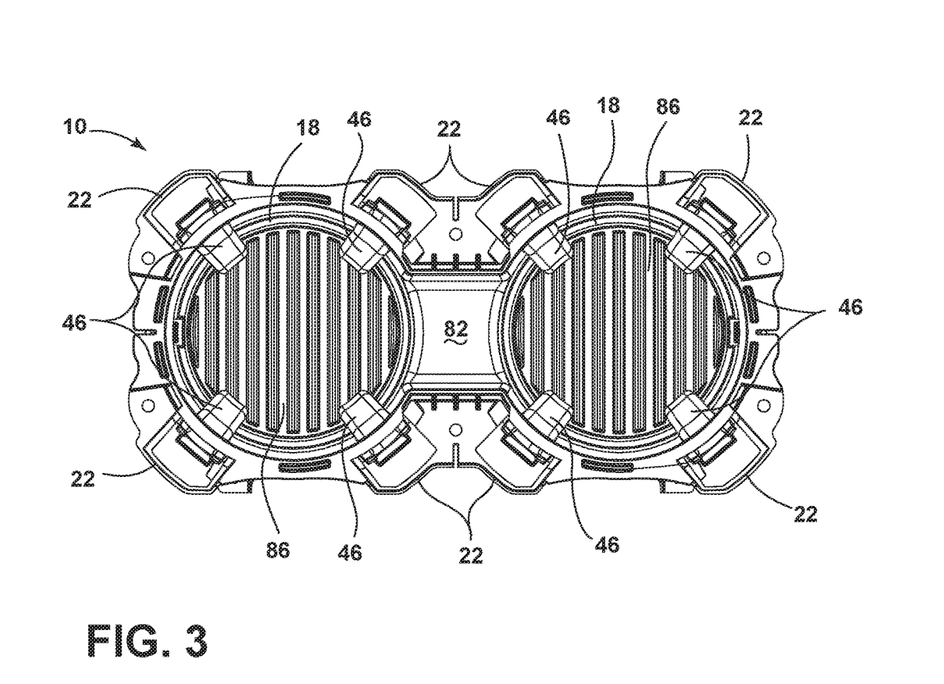
FIG. 3 is a top view of the cup holder assembly having stabilizer arms in a fully extended inward position.
Figure 4:
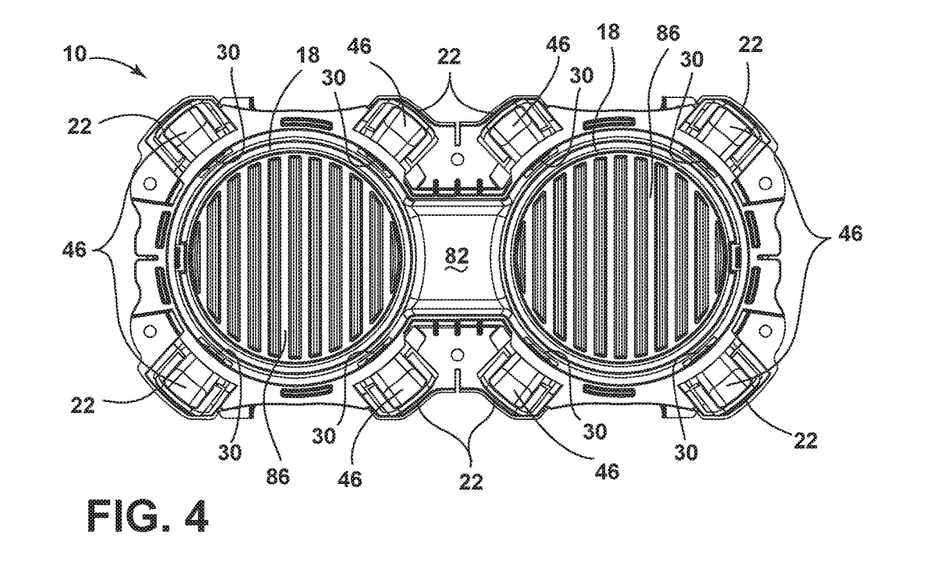
FIG. 4 is a top view of the cup holder assembly having stabilizer arms in a fully retracted outward position.
Figure 8:
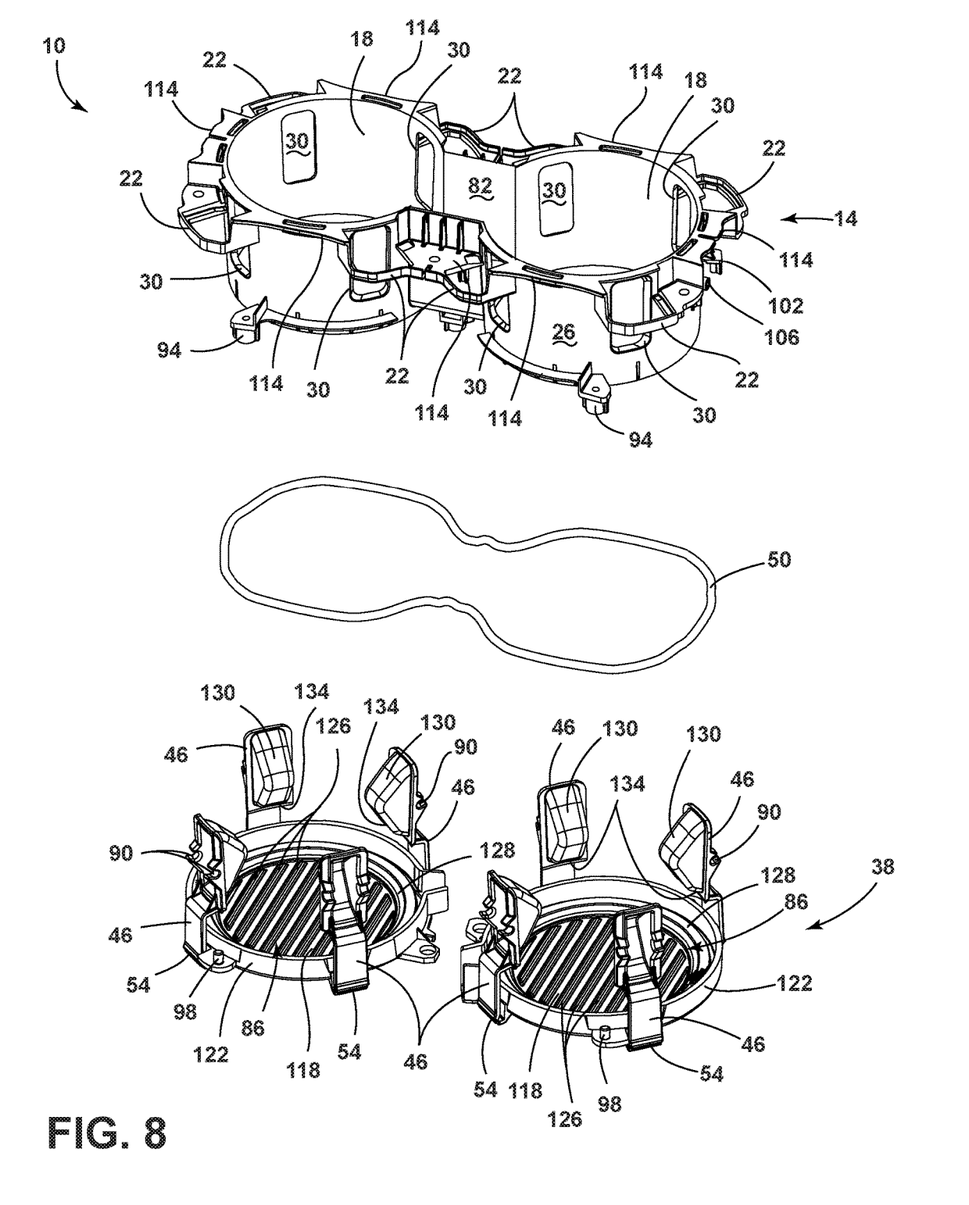
FIG. 8 is an exploded view of the cup holder assembly, illustrating a first portion, a second portion, and a biasing member separated from each other.

Referring now to FIGS. 3 and 4, the cup holder assembly 10 is shown with the stabilizer arms 46 in a fully extended position (FIG. 3) and a fully retracted position (FIG. 4). A container support surface 86 can be seen in the bottom of each of the container apertures 18. The container support surfaces 86 are integrally formed with the second portion 38 of the cup holder assembly 10 (FIG. 8). The travel guides 22 are positioned on the exterior surface 26 of the container apertures 18. The travel guides 22 guide radially actuation of the stabilizer arms 46 between the fully extended and fully retracted positions as well as positions therebetween. The travel guides 22 prevent side-to-side movement of the stabilizer arms 46 within the stabilizer arm apertures 30, thereby preventing binding of the stabilizer arms 46 within the stabilizer arm apertures 30. The binding of stabilizer arms 46 within the stabilizer arm apertures 30 can cause the stabilizer arms 46 to become stuck within the stabilizer arm apertures 30, which prevents radial actuation of the stabilizer arms 46 in response to the container 78 (FIG. 2) being inserted into the container aperture 18. Additionally, the travel guides 22 prevent over-extension of the stabilizer arms 46 radially outward that results in the stabilizer arms 46 exiting the stabilizer arm apertures 30. As can be seen in FIG. 4, when the stabilizer arms 46 are in the fully retracted position at least a portion of the stabilizer arm 46 remains within the stabilizer arm aperture 30 and/or the container aperture 18, thereby preventing side-to-side movement and/or over-extension of the stabilizer arm 46.

Figure 5:
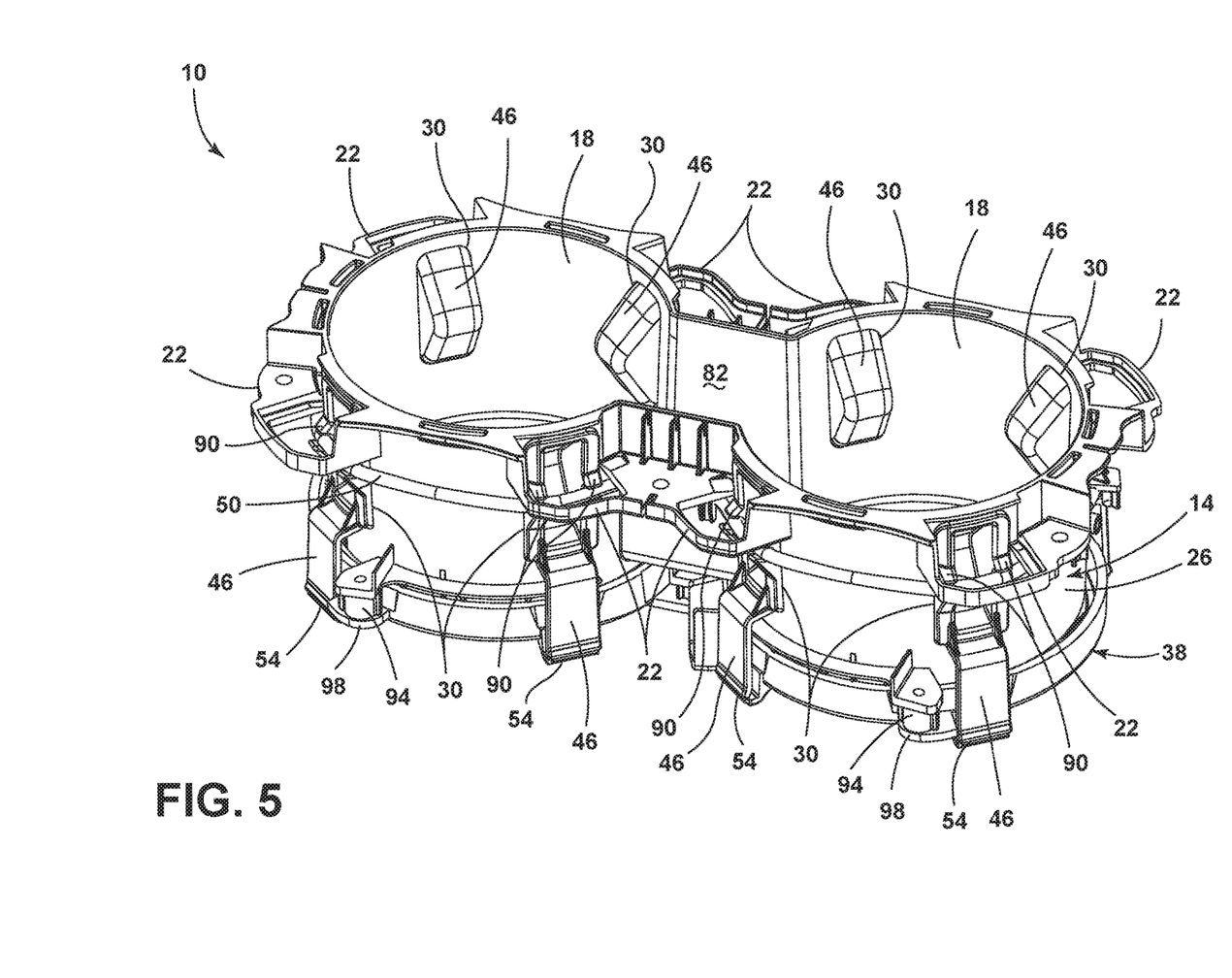
FIG. 5 is a side perspective view of the cup holder assembly, according to one embodiment.
Figure 6:
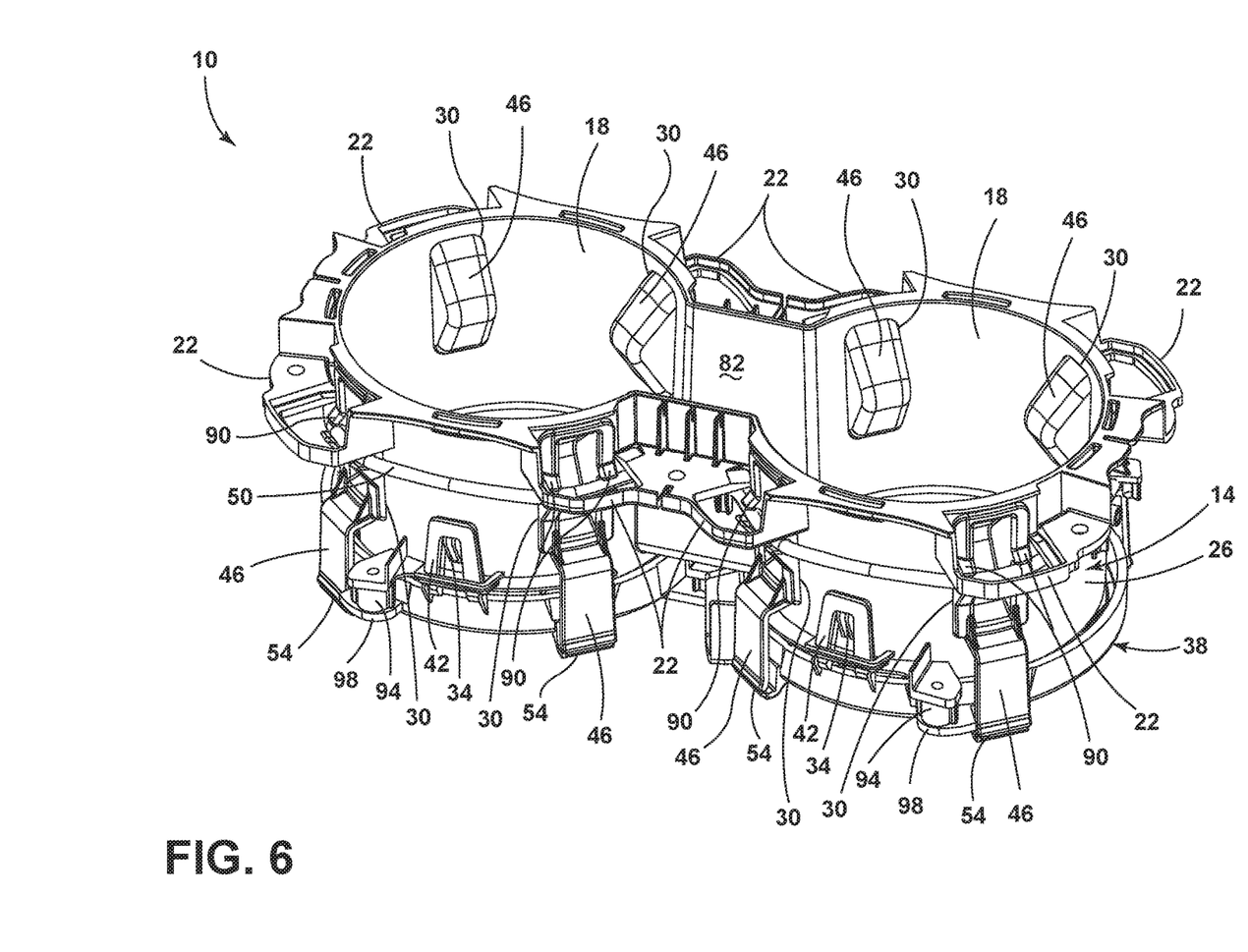
FIG. 6 is a side perspective view of the cup holder assembly, according to one embodiment.

Referring to FIGS. 5 and 6, the cup holder assembly 10 is shown in an assembled state having the first portion 14 and the second portion 38 operably coupled with one another. Additionally, the biasing member 50 is positioned about the perimeter of the container apertures 18 and engages with a biasing member engagement feature 90 that is located on an outward surface of each of the stabilizer arms 46. A biasing force of the biasing member 50 and the biasing member engagement features 90 on each of the stabilizer arms 46 ensures that continuous contact is maintained between the biasing member 50 and the stabilizer arms 46 when the cup holder 10 is in the assembled state. The first portion 14 of the cup holder assembly 10 can include downward facing alignment receptacles that are configured to engage with upward facing alignment pegs 98 that are positioned on the second portion 38. The upward facing alignment pegs 98 on the second portion 38 engage with the downward facing alignment receptacles 94 on the first portion 14 to aid in proper alignment and securement of the first portion 14 and the second portion 38 during assembly. The downward facing alignment receptacles 94 and the upward facing alignment pegs 98 may also serve as fasteners that secure the first portion 14 to the second portion 38. It is contemplated that various fasteners may be used to fasten the first portion 14 to the second portion 38 without departing from the concepts disclosed herein. For example, suitable fasteners or fastening engagements include, but are not limited to, screws, rivets, plastic welding, heat stakes, quarter-turn fasteners, push-pins, snaps, and the like. The cup holder assembly 10 may further include one or more clip-engagement features 34 and one or more clips 42. The clip-engagement features 34 are positioned on the first portion 14. The clips 42 are positioned on the second portion 38. The clip-engagement features 34 and the clips 42 are configured to operably engage with one another to retain the first portion 14 to the second portion 38. The number of clips 42 that are employed on the second portion 38 corresponds with the number of clip-engagement features 34 on the first portion 14.

Figure 7:
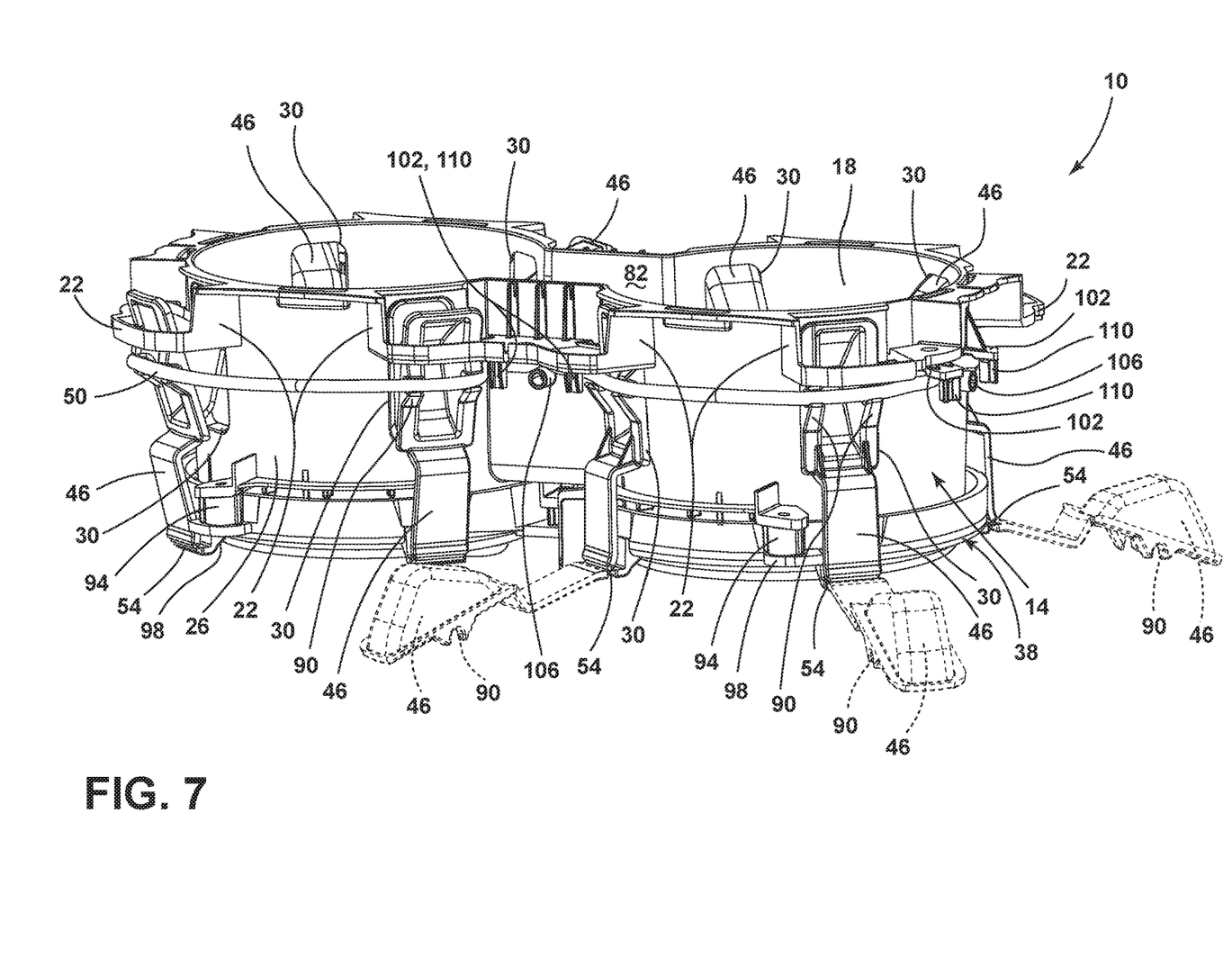
FIG. 7 is a side view of the cup holder assembly.

Referring now to FIG. 7, one of the container apertures 18 of the cup holder assembly 10 is shown with the stabilizer arms 46 in at least a partially retracted position (i.e., the left container aperture 18) and the other of the container apertures 18 is shown with the stabilizer arms 46 in the fully extended position (i.e. the right hand container aperture 18). Additionally, shown in phantom are stabilizer arms 46 that have been removed from the stabilizer arm apertures 30 and pivoted downward about the living hinge 54 of the second portion 38. The first portion 14 can be formed as a single integral piece that is equipped with each of the features described above for the first portion 14, for example, by injection molding. Similarly, the second portion 38 can be formed as a single piece that integrally includes each of the components described above for the second portion 38, for example, by injection molding. Forming the first and second portions 14, 38 as individual pieces having their respective components integrally formed therewith decreases the overall package size of the cup holder assembly 10 and enables rapid assembly of the first portion 14 to the second portion 38 to provide the cup holder assembly 10.

Referring again to FIG. 7, the living hinge 54 may have a thin portion that forms a U-shape when the stabilizer arm 46 is pivoted upward to a beverage retainer position, according to one embodiment. The living hinge 54 has a reduced thickness area that allows for the pivoting motion of the stabilizer arm 46 relative to the rest of the second portion 38 during assembly and during use of the cup holder assembly 10. The first portion 14 can further include a plurality of upward retention features 102 and a plurality of downward retention features 106 on the exterior surface 26 of the first portion 14. The plurality of upward retention features 102 prevent the biasing member 50 from longitudinal movement in an upward direction along the perimeter of the first portion 14. The plurality of downward retention features 106 prevent the biasing member 50 from longitudinal movement in a downward direction along the perimeter of the first portion 14. In some embodiments, there may be twice as many upward retention features 102 as downward retention features 106. For example, each downward retention feature 106 may be flanked on either side by the upward retention features 102 such that the biasing member 50 passes through the upward retention features 102 and downward retention features 106 in a generally serpentine path. The upward retention features 102 and/or the downward retention features 106 may additionally include retention protrusions 110 that extend from the upward retention features 102 and/or the downward retention features 106 in a direction that is perpendicular to the upward retention features 102 and/or downward retention features 106. Said another way, the upward retention features 102 and the downward retention features 106 can extend perpendicularly from the exterior surface 26 of the first portion 14 and the retention protrusions 110 can extend in a direction that is parallel to the exterior surface 26 of the first portion 14. The retention protrusions 110 can provide a retention force to the biasing member 50 that prevents disengagement of the biasing member 50 from the upward retention features 102, downward retention features 106, and the biasing member engagement features 90 when the stabilizer arms 46 are actuated radially outward against the biasing member 50 by, for example, the container 78 being inserted into one of the container apertures 18.

Referring now to FIG. 8, the first portion 14, the second portion 38, and the biasing member 50 are shown separated from one another. Each of the stabilizer arm apertures 30 can be seen extending radially inward from each of the travel guides 22. Each travel guide 22 may be interconnected with at least one other travel guide 22 by a support structure 114. The support structures 114 can provide additional rigidity to the travel guides 22 to prevent flexing or damage to the travel guides 22 during assembly and/or actuation of the stabilizer arms 46. The downward facing alignment receptacles 94 can be positioned on a lower region of the first portion 14. The biasing member 50 may be configured to generally correspond with the perimeter of the first portion 14. The biasing member 50 has a memory and is sized to compress and apply an inward biasing force to the stabilizer arms 46. Alternatively, the biasing member 50 may be generally circular or oval in shape without including contours that specifically mimic the perimeter of the first portion 14. Individual biasing members 50 may be employed around each of container aperture 18. The biasing member 50 may be made of a resilient material such as a polymer, rubber, silicone, or the like. Biasing member 50 may be generally tubular in shape or cylindrical such that a cross-section of the biasing member 50 has a circular profile. Alternatively, the biasing member 50 may have a cross-sectional profile of any polygon, for example, and without limitation, a rectangle or a triangle.

The second portion 38 is shown in FIG. 8 with the stabilizer arms 46 in the beverage retention position. The second portion 38 may be integrally formed to include any number of container support surfaces 86. Alternatively, FIG. 8 shows the second portion 38 as individual assemblies that each includes container support surfaces 86. The individually formed assemblies of the second portion 38 may operably couple to one another during assembly of the cup holder assembly 10. Alternatively, the individually formed assemblies of the second portion 38 may operably couple to the first portion 14 without direct operable coupling between the individually formed assemblies of the second portion 38. Embodiments that may benefit from utilizing individually formed assemblies of the second portion 38 are embodiments that employ four or more stabilizer arms 46. Embodiments that may benefit from utilizing integrally formed assemblies of the second portion 38 are embodiments that employ three or fewer stabilizer arms 46. The upward facing alignment pegs 98 extend radially outward of the container support surface 86. The container support surface 86 can include a planar portion 118 and a side wall portion 122. The planar portion 118 can have a series of ridges 126 integrally formed therewith that support the container 78 (FIG. 2) while allowing for liquid or other debris to accumulate between the series of ridges 126. Alternatively, the planar portion 118 can include a removable mat 128 that couples with the planar portion 118. The removable mat 128 can include the series of ridges 126. Additionally, the planar portion 118 and the removable mat 128 may be equipped with the series of ridges 126. The side wall portion 122 extends in an upward direction and is perpendicular to the planar portion 118 to further retain liquid and/or debris that accumulates in the planar portion 118 of the container support surface 86. Since the second portion 38 is provided as an integral and continuous piece of material the liquid and/or debris that accumulates in the planar portion 118 of the container support surface 86 is prevented from exiting the cup holder assembly 10 to interfere with or cause damage to the area where the cup holder assembly 10 is installed.

Referring further to FIG. 8, the stabilizer arms 46 include a downward sloping portion 130 and an upward sloping portion 134 on an inward surface of each stabilizer arm 46. The downward sloping portion 130 and the upward sloping portion 134 of the stabilizer arms 46 allow for radial actuation of the stabilizer arms 46 in response to engagement of the stabilizer arms 46 with the container 78 as it is inserted into one of the container apertures 18. The downward sloping portion 130 additionally aids in providing continuous contact with an underside of the container 78 as it is inserted into the container aperture 18. Without the downward sloping portion 130 of the stabilizer arms 46, a user of the cup holder assembly 10 may encounter difficulty when inserting the container 78 into the container aperture 18. For example, if a flat non-sloping surface were presented to the container 78 as it was inserted into the container aperture 18, then the container 78 may have a tendency to rest on the stabilizer arm 46 rather than passing into the container aperture 18 to rest upon the container support surface 86. Additionally, the downward sloping portion 130 and the upward sloping portion 134 allow for the radial actuation of the stabilizer arms 46 in and out of the stabilizer arm apertures 30 without causing binding or sticking of the stabilizer arms 46 as the stabilizer arms 46 pivot about the living hinge 54.

Automotive vehicles are commonly equipped with various trim components that provide aesthetically pleasing and functional features onboard the vehicle 58. Some automotive vehicles also employ drink or beverage holders, such as the cup holder assembly 10, to retain beverage containers such that the containers do not tip over during vehicle 58 maneuvers (e.g. acceleration, deceleration, cornering, etc.). Conventional cup holders often permit side-to-side movement and/or over-extension of stabilizers, such as the stabilizer arms 46. The side-to-side movement and/or over-extension of stabilizers that is permitted by conventional cup holders can result in binding or disengagement of the stabilizer, which results in the stabilizer becoming inoperable for its intended purpose. Additionally, the freedom of motion of the stabilizers in conventional cup holders can result in disengagement of components that interact with the stabilizers, for example the biasing member 50 disclosed herein.

The cup holder assembly 10 of the present disclosure provides travel guides 22 for each stabilizer arm 46. The travel guides 22 prevent side-to-side movement and over-extension of the stabilizer arms 46 within the stabilizer arm apertures 30. The travel guides 22 can prevent movement of the stabilizer arms 46 beyond the intended functional motion of the stabilizer arms 46. The cup holder assembly 10 of the present disclosure provides upward retention features 102, downward retention features 106, and retention protrusions 110 to further aid the travel guides 22 in maintaining the biasing member 50 in constant contact with the stabilizer arms 46. The combination of limiting the movement of the stabilizer arms 46 to the intended functional motion of the stabilizer arms 46 with the travel guides 22 and the constant contact maintained between the biasing member 50 and the stabilizer arms 46, as aided by the upward retention features 102, the downward retention features 106, and the retention protrusions 110, prevent disengagement of the biasing member 50 from the stabilizer arms 46. The concepts disclosed herein provide the cup holder assembly 10 as a longer-lasting and more robust assembly than conventional cup holders.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A cup holder assembly comprising:
   a first portion comprising:
      a container aperture;
      travel guides positioned on an exterior surface of the container aperture;
      a stabilizer arm aperture in a perimeter of the container aperture positioned radially inward of each travel guide;
      one or more clip-engagement features;
   a second portion comprising:
      one or more clips that are configured to couple with the clip-engagement features of the first portion, wherein the one or more clips correspond to the one or more clip-engagement features;
      a plurality of stabilizer arms integrally formed with the second portion, wherein each of the stabilizer arms is pivotable about a living hinge, and wherein each of the stabilizer arms is inserted into one of the stabilizer arm apertures, and wherein the travel guides guide radial actuation of the stabilizer arms to prevent side-to-side movement of the stabilizer arms within the stabilizer arm apertures and prevent over-extension of the stabilizer arms that can result in the stabilizer arm exiting the stabilizer arm aperture; and
      a biasing member positioned about the perimeter of the container aperture that biases the stabilizer arms radially inward.

2. The cup holder assembly of claim 1, further comprising:
   downward facing alignment receptacles on the first portion; and
   upward facing alignment pegs on the second portion to aid in proper alignment of the first portion and the second portion during assembly.

3. The cup holder assembly of claim 1, further comprising:
   a plurality of upward retention features, wherein the plurality of upward retention features prevent the biasing member from longitudinal movement in an upward direction along the perimeter of the container aperture.

4. The cup holder assembly of claim 1, further comprising:
   a plurality of downward retention features, wherein the plurality of downward retention features prevent the biasing member from longitudinal movement in a downward direction along the perimeter of the container aperture.

5. The cup holder assembly of claim 1, wherein the stabilizer arms each include a biasing member engagement feature on an outward surface of the stabilizer arms such that continuous contact is maintained between the biasing member and the stabilizer arms when assembled.

6. A cup holder assembly comprising:
   a first portion;
   travel guides positioned on an exterior surface of the first portion;
   a stabilizer arm aperture in the first portion positioned radially inward of each travel guide;
   a second portion having a plurality of stabilizer arms, wherein each of the stabilizer arms is pivotable about a living hinge, and wherein each of the stabilizer arms is inserted into one of the stabilizer arm apertures, and wherein the travel guides guide radial actuation of the stabilizer arms; and
   a biasing member positioned about a perimeter of the first portion that biases the stabilizer arms radially inward.

7. The cup holder assembly of claim 6, wherein the travel guides prevent side-to-side movement of the stabilizer arms within the stabilizer arm apertures.

8. The cup holder assembly of claim 6, wherein the travel guides prevent over-extension of the stabilizer arms.

9. The cup holder assembly of claim 6, further comprising:
   one or more clip-engagement features positioned on the first portion.

10. The cup holder assembly of claim 9, further comprising:
    one or more clips positioned on the second portion that are configured to couple with the clip-engagement features, wherein the number of clips corresponds to the number of clip-engagement features.

11. The cup holder assembly of claim 6, further comprising:
    a plurality of upward retention features, wherein the plurality of upward retention features prevent the biasing member from longitudinal movement in an upward direction along the perimeter of the first portion.

12. The cup holder assembly of claim 6, further comprising:
    a plurality of downward retention features, wherein the plurality of downward retention features prevent the biasing member from longitudinal movement in a downward direction along the perimeter of the first portion.

13. The cup holder assembly of claim 6, wherein the stabilizer arms each include a biasing member engagement feature on an outer surface of the stabilizer arms such that continuous contact is maintained between the biasing member and the stabilizer arms when assembled.

14. A cup holder assembly comprising:
    a container aperture;
    a travel guide on an exterior surface of the container aperture;
    a stabilizer arm aperture radially inward of the travel guide;
    a stabilizer arm pivotable about a living hinge and inserted into the stabilizer arm aperture, wherein the travel guide guides radial actuation of the stabilizer arm; and
    a biasing member that biases the stabilizer arm radially inward.

15. The cup holder assembly of claim 14, wherein the travel guides prevent side-to-side movement of the stabilizer arms within the stabilizer arm apertures.

16. The cup holder assembly of claim 14, wherein the travel guides prevent over-extension of the stabilizer arms.

17. The cup holder assembly of claim 14, further comprising:
    a plurality of upward retention features, wherein the plurality of upward retention features prevent the biasing member from longitudinal movement in an upward direction along a perimeter of the container aperture.

18. The cup holder assembly of claim 14, further comprising:
    a plurality of downward retention features, wherein the plurality of downward retention features prevent the biasing member from longitudinal movement in a downward direction along a perimeter of the container aperture.

19. The cup holder assembly of claim 14, wherein the stabilizer arms each include a biasing member engagement feature on an outward surface of the stabilizer arms such that continuous contact is maintained between the biasing member and the stabilizer arms when assembled.

20. The cup holder assembly of claim 14, wherein the biasing member is positioned about a perimeter of the container aperture.

* * * * *